June 30, 1959 L. H. CONNELL 2,892,899

MAGNETIC RECORDING

Filed Jan. 29, 1954

INVENTOR.
LAWRENCE H. CONNELL
BY Whittemore, Hulbert & Belknap
ATTORNEYS 2,892,899

MAGNETIC RECORDING

Lawrence H. Connell, Haines City, Fla., assignor to Phyllis L. Razete, Cincinnati, Ohio Application January 29, 1954, Serial No. 407,131

4 Claims. (Cl. 179—100.2)

The present invention relates to magnetic recording and more particularly to certain improvements in a record element, apparatus for withdrawing an elongated record element from one casing, advancing it past a recording or reproducing head in contact therewith, and causing the record element to be coiled up in a second casing, and a recording or reproducing head for use with the record element.

The present application is a continuation-in-part of my prior copending application Serial No. 74,936, filed February 7, 1949.

It is an object of the present invention to provide apparatus for storing an elongated record element and for withdrawing the record element from one casing and causing it to assume a coiled condition in the second casing.

It is a further object of the present invention to provide a novel tape for use in magnetic recording characterized by exceptional longitudinal stiffness combined with the ability to coil the tape into relatively small containers.

More specifically, it is an object of the present invention to provide a normally transversely cambered recording tape.

It is a feature of the present invention to provide a transversely cambered recording tape in which the body portion of the tape is formed of a hard drawn spring brass having a width approximately 1/10 of an inch and a thickness of approximately .002 inch, having on one or both surfaces thereof a coating of permanent magnetic material such for example as 80–20 nickel cobalt alloy having a thickness of about .0002 inch.

It is a further object of the present invention to provide a novel method of storing and handling tape in conjunction with magnetic recording which comprises providing normally transversely cambered recording tape, advancing the tape between a supply and receiving container, the containers being mounted for free rotation, rotating the supply container solely by the withdrawal of tape therefrom, and rotating the receiving container solely by the advance thereinto of the relatively stiff normally transversely cambered tape.

It is a further object of the present invention to provide a novel method of storing and handling tape as described in the preceding paragraph in which the tape intermediate the containers is advanced over a transducing head which is convexly curved in the direction of advance of the tape to flatten the tape transversely, or alternatively is advanced over a cylindrical capstan or roller while the side of the tape opposite to the portion of the tape in contact with the capstan is engaged by a transducing head, or engaging a straight portion of the tape intermediate the containers with a transducing head having a tape engaging surface curved in conformity with the transverse camber of the tape.

Other objects and features of the invention will become apparent as the description proceeds, especially when taken in conjunction with the accompanying drawings, wherein.

Figures 1, 2, 3, 4, 5, 6:
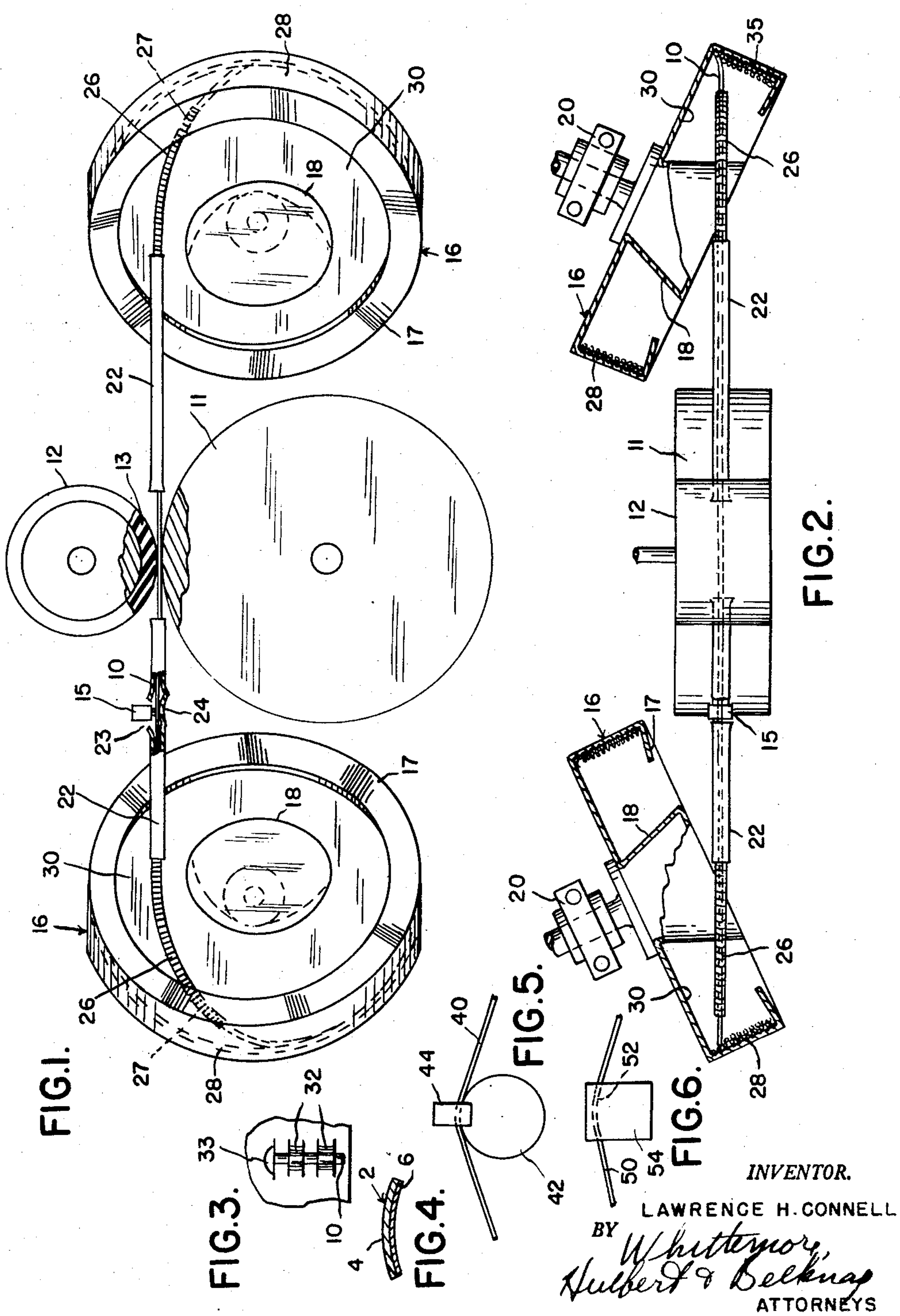
Figure 1 is a front elevation with parts in section of a pair of record element casings shown in conjunction with a recording or reproducing head and means for withdrawing an elongated record element from one casing and storing it in the other casing.
Figure 2 is a plan view of the structure shown in Figure 1, with parts in section.
Figure 3 is a detail elevation showing the method of securing one end of the record element in operative relation to the casing.
Figure 4 is a transverse section through the novel recording tape disclosed herein.
Figure 5 is a diagrammatic view of one method of employing the tape in conjunction with a capstan and transducing head.
Figure 6 is a diagrammatic view illustrating another method of employing the tape in conjunction with a transducing head.

The present invention is directed particularly to a novel recording tape and also to certain novel methods and apparatus designed for use in conjunction therewith.

Referring first to Figure 4 a recording tape 2 is illustrated therein in section, made up of a supporting body 4 and a coating 6 of magnetic material. In the preferred form of the invention the supporting body of the tape 2 is formed of hard drawn spring brass having a width of about 1/10 of an inch and a thickness of about .002 inch. The tape is illustrated as having on one surface thereof, and preferably its transversely concave surface, a coating of permanent magnetic material which may be any suitable material but which preferably is a 80–20 nickel cobalt alloy. This coating may be applied by plating, chemical deposition, thermal evaporation from a vacuum, sputtering, or the like. In practice, the thickness of the magnetic material is approximately .0002 inch.

Tape of this type may conveniently be produced from relatively wide elongated strip such for example as eight inch strip, which will be provided with the magnetic material at one or both sides, and which will thereafter be split into a plurality of strips. Thus for example, when the strip is eight inches wide and the tape is produced in strips 1/10 of an inch wide, 80 strips may be formed from the original eight inch brass strip.

The transverse camber imparted to the tape is sufficient to cause the tape to tend to remain in longitudinally straight condition. This has the effect of imparting a certain stiffness to the tape which is taken advantage of in the method disclosed herein and the apparatus for carrying out the improved method. The tape however, may be readily bent transversely and wound or coiled into a relatively small coil. It will be appreciated that when in longitudinally straight condition, the tape will exhibit its transverse camber, but then when the tape is coiled as further described herein, or is longitudinally curved, the transverse camber of the tape disappears.

While reference was previously made to a specific tape formed of hard drawn spring brass coated on one or both surfaces with a permanent magnetic material such for example as 80–20 nickel cobalt, it will be appreciated that useful magnetic recording tape may be produced with other materials. The first requirement of the magnetic recording tape is that it be formed of resilient material so that when cambered, straight sections of the tape exhibit substantial stiffness, while at the same time the tape may be coiled as disclosed herein. Instead of employing hard drawn spring brass as the base material, the tape could be formed of unplated stainless steel, the steel being selected to exhibit the required permanent magnetic properties. Alternatively, the tape could be of a suitable steel having a copper plating to provide a breaker strip over which the nickel cobalt alloy could be applied. Again, the steel tape could be copper plated on both sides and coated with a permanent magnetic material on both sides to provide a tape useful on both sides.

In Figures 1–3 there is illustrated a record element at 10 of the cambered tape type as referred to above. The record element 10 is pressed between feed rolls 11 and 12, the roll 12 preferably being provided with a soft rubber rim portion 13 for pressing the record element 10 against the roll 11. One of the rolls, as for example the roll 11, is driven by suitable constant speed drive mechanism for advancing the record element in one direction or the other.

In the illustrated embodiment the record element is advanced past a recording or reproducing head indicated at 15 and preferably for recording or reproducing, the record element is advanced from left to right so that the portion of the record element in contact with the head 15 is under tension. It will be observed that the portion of the record element 10 engaged by the head 15 is longitudinally straight so that where the transversely cambered tape disclosed herein is employed, the transverse camber will be present in the tape when it engages the head 15. Accordingly, the tape engaging surface of the head 15 will be transversely curved in conformity to the camber of the tape.

A pair of identical shells or containers 16 are provided, each of which comprises a generally cylindrical shell open at one side except for the provision of an inturned flange 17. The container 16 is provided with a central post or hub 18 which is integral therewith or secured for simultaneous rotation with the container 16. The container 16 is formed of very light material and is mounted on a ball bearing support 20 so that it rotates very freely. The width or diameter of said shells is several times the depth thereof so that a substantial lever arm is provided to produce a relatively large turning torque with the small force available from the fine tape or wire. The free end of the post is enlarged and the post is tapered so that in drawing wire or tape from a shell, there is no tendency for it to slip off the post even if the tubular guides are omitted. This is best illustrated in Figure 2.

The containers 16 are mounted obliquely with respect to the feed rolls 11 and 12, as best illustrated in Figure 2, and the record element 10 is withdrawn from and introduced into the container 16 through the open side thereof.

Intermediate the containers 16 the record element 10 is advanced through supporting tubes 22, one of which has an opening in one side thereof as indicated at 23, to receive the recording head 15. Preferably, at this point the side of the tube 22 opposite to the opening 23 is formed inwardly as indicated at 24 to provide a bearing surface. The record element 10 is drawn through the tube 22 and is pressed against the bearing surface of the tube by the head 15 so that the record element is always in firm continuous contact with the pole surfaces of the magnetic head.

The tubes 22 are rigid but at the ends thereof which extend into the container 16, they may be provided with flexible end portions 26 which may be wire wrapped flexible tubing. It will be appreciated that where the transversely cambered tape disclosed herein is employed, it may be possible to omit the flexible end portions 26. However, by employing such end portions the apparatus disclosed herein may be employed with ordinary narrow flat record tape or it may be employed with relatively fine wire which has been employed in the past as a record element.

The flexible end portions 26 are curved at their ends as indicated at 27 so as to direct the record element 10 more or less tangentially with respect to the peripheral wall 28 of the container 16. As the record element accumulates in the container in which it is being advanced, the accumulation of record element will engage the end of the flexible portion 26 and will bend it toward the center of the container so as to provide space for additional coils of the record element.

The end of the flexible member 26 which thus comes in contact with the turns or convolutions of record elements is preferably rounded so as to reduce drag on the container 16 from which the record element is being withdrawn.

If desired, the flexible resilient curved member 26 may additionally be provided in contact with the corner of the container 16 provided at the conjuncture of the peripheral wall 28 and the bottom wall 30. In this way, the length of record element between the end of the flexible member 26 and the convolutions of the record element in contact with the inner surface of the casing is reduced to substantially zero. This results in a corresponding increase in the effective stiffness of the wire.

From the foregoing it will be appreciated that by positive rotation of the feed rolls 11 and 12, the record element is withdrawn from one casing and is pushed into the other casing. Due to the stiffness of the record element this results in rotation of the casing or container into which the record element is being fed. Since the casings or containers are extremely light and are mounted on ball bearings so as to provide for very free rotation, this method becomes practical and avoids the use of complicated mechanisms which have heretofore been provided for controlling the rotation of the reels on which the record element has been wound.

The central post 18 is provided so that the supply reel from which the record element is being withdrawn, may be rotated even though initial withdrawal of the record element may cause the first convolution or coil of record element to move inwardly of the container into contact with the post 18.

In order that initial movement of the end of the record element into an empty container may cause rotation of the container, it is preferred to thread the end of the record element into a suitable seat provided adjacent the periphery of the container. Such a seat is indicated at Figure 3 in which a pair of loops 32 are struck upwardly from the material of the container and an abutment 33 is formed upwardly. The end of the record element 10 is passed through the loops 32 into engagement with the abutment 33. Thus, when the end of the element is pushed by the feed rolls 11 and 12 into the container, the end of the element is retained firmly against the abutment 33 and will thus impart rotation to the container. When the element is being withdrawn from the container, the end of the record element is automatically withdrawn.

The generally inwardly extending flange 17 defines an inwardly open angular chamber for the reception of the tape and it will be appreciated that as the tape coils itself into the interior of the container it will engage against the inner surface of the flange 17 which will start the tape coiling itself into a spiral extending toward the bottom wall of the container.

In the event that the record element 10 is of the transverse camber type previously referred to, it will of course be understood that the periphery of the roll 11 is correspondingly curved to conform to the transverse camber of the record element. The soft rubber rim of the roll 12 adjusts itself to the record element. Similarly, the pole faces of the recording or reproducing head 15 are correspondingly curved to provide the maximum physical contact therewith.

Inasmuch as the forces available for turning the container 16 are not great, best results are obtained when the drive means for the feed rolls 11 and 12 has associated therewith means for insuring relatively gradual starting and stopping of the record element.

Attention is directed to the fact that the conduits 22 and flexible resilient portions 26 orginally direct the record element into corners at the interior of the casings or containers 16. Accordingly, the record element tends to build up adjacent the corner and turns or convolutions of record element previously laid tend to prevent sidewise slipping of the portion of the record element being discharged from the flexible end portion 26. If desired, sidewise or lateral movement of the record element with respect to the container during the depositing of the first layer of turns may be prevented by providing the peripheral wall 28 of the casing with a grooved inner surface as indicated at 35 in Figure 2.

Referring now to Figure 5 a section of the transversely cambered tape is designated at 40 and it is shown as being advanced around a capstan or roller 42 which is of cylindrical configuration. Inasmuch as the tape 40 is curved by its contact with the convex cylindrical surface of the roller 42, it becomes straight transversely throughout the zone of its longitudinal curvature. Accordingly, it may be engaged at this point by a transducing head 44 having a transversely straight tape engaging surface which however will be longitudinally concavely curved in conformity with the convex curvature of the portion of the tape engaging the roller 42.

Referring now to Figure 6 there is illustrated another arrangement in which a transversely cambered record tape 50 is advanced over a convexly curved tape engaging surface 52 of a transducing head 54. In this case the magnetic material is applied to the concave side of the transversely cambered tape which while curved longitudinally in conformity to the convex surface 52 of the head becomes transversely straight.

In Figures 5 and 6 the head is illustrated as having lateral flanges extending at opposite sides of the tape to guide the tape and restrain it against transverse movement whereby to retain the tape in guided contact with the magnet poles of the head.

The drawings and the foregoing specification constitute a description of the improved magnetic recording in such full, clear, concise and exact terms as to enable any person skilled in the art to practice the invention, the scope of which is indicated by the appended claims.

What I claim as my invention is:

1. In combination, a tape for a magnetic recorder and reproducer comprising a permanent magnetic material, said tape being shaped to have a normal cross camber and being resilient, a drive capstan for said tape having a periphery shaped to interfit one curved side of said tape, and a yieldable pressure roll engaging said tape and holding said tape firmly against said capstan.

2. Record handling apparatus comprising a pair of record shells open at the sides thereof, means mounting said shells for free rotation, a pair of feed rolls intermediate said shells, and guide means for enveloping a semi-rigid record element from a point directly adjacent said feed rolls to points within said shells, said guide means comprising substantially rigid straight tubular members, one of said members having a transverse opening to expose the record element for contact with a magnetic head, the wall of said tubular member opposite said opening being shaped to form a rounded projection extending toward the opening.

3. Record handling apparatus comprising a pair of record shells each having a flat wall at one end thereof, a cylindrical side wall, a core of circular cross-section of substantial diameter extending perpendicularly from said flat wall, an annular flange extending inwardly from the side wall toward said core and terminating short thereof to provide an annular opening into said shell between the inner edge of said flange and said core, means mounting said shells for substantially free rotation, said means positioning said shells obliquely to a line joining said shells with the open ends thereof inclined towards each other, drive means intermediate said shells for engaging and feeding flexible but slightly stiff record element out of one shell and into the other, and tubular guide means supporting the section of the record element intermediate said drive means and both of said shells, the ends of said guide means remote from said drive means extending at least into proximity to the annular openings in said shells.

4. A container for an elongated magnetic recording element comprising a flat bottom wall, a cylindrical outer wall extending perpendicular to said bottom wall from the outer edge thereof, a generally inwardly extending flange at the top of said outer wall, and a central post extending from said bottom wall and defining therewith and with said outer wall and flange a generally annular storage compartment having an annular opening therein intermediate said post and inner edge of said flange, the width of said shell being several times its depth, the inner surface of the cylindrical outer wall having grooves extending generally circumferentially thereof.

References Cited in the file of this patent

UNITED STATES PATENTS

| | | |
|---|---|---|
| 1,119,489 | Bingham | Dec. 1, 1914 |
| 1,134,664 | Bingham | Apr. 6, 1915 |
| 1,294,384 | Borden | Feb. 18, 1919 |
| 1,382,040 | Wilson | June 21, 1921 |
| 1,479,333 | Stephenson | Jan. 1, 1924 |
| 1,517,770 | Ziegler | Dec. 2, 1924 |
| 2,073,928 | Gassen | Mar. 16, 1937 |
| 2,085,439 | Morlock | June 29, 1937 |
| 2,220,481 | Fritts | Nov. 5, 1940 |
| 2,319,828 | Rohweder | May 25, 1943 |
| 2,428,002 | Barrett | Sept. 30, 1947 |
| 2,443,756 | Williams | June 22, 1948 |
| 2,481,004 | Dale | Sept. 6, 1949 |
| 2,603,721 | Camras | July 15, 1952 |
| 2,632,061 | Begun | Mar. 17, 1953 |